United States Patent
Ishizuka

(10) Patent No.: US 9,235,238 B2
(45) Date of Patent: Jan. 12, 2016

(54) MOBILE ELECTRONIC DEVICE WITH DUAL TOUCH DISPLAYS AND MULTITASKING FUNCTION, CONTROL METHOD, AND STORAGE MEDIUM STORING CONTROL PROGRAM

(75) Inventor: Yuka Ishizuka, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 394 days.

(21) Appl. No.: 13/455,437

(22) Filed: Apr. 25, 2012

(65) Prior Publication Data
US 2012/0274613 A1 Nov. 1, 2012

(30) Foreign Application Priority Data
Apr. 26, 2011 (JP) ................................. 2011-098653

(51) Int. Cl.
G06F 3/041 (2006.01)
G06F 1/16 (2006.01)
G06F 3/14 (2006.01)
G06F 1/32 (2006.01)

(52) U.S. Cl.
CPC ............ *G06F 1/1647* (2013.01); *G06F 1/3231* (2013.01); *G06F 1/3265* (2013.01); *G06F 1/3287* (2013.01); *G06F 3/0416* (2013.01); *G06F 3/1423* (2013.01); *G09G 2330/021* (2013.01); *G09G 2340/0492* (2013.01); *Y02B 60/1242* (2013.01); *Y02B 60/1282* (2013.01); *Y02B 60/1289* (2013.01)

(58) Field of Classification Search
USPC ................................................... 345/1.3, 204
See application file for complete search history.

(56) References Cited

U.S. PATENT DOCUMENTS

| | | | | |
|---|---|---|---|---|
| 2002/0135541 | A1* | 9/2002 | Kowalewski | ................... 345/31 |
| 2007/0257894 | A1* | 11/2007 | Philipp | ........................ 345/173 |
| 2010/0245106 | A1* | 9/2010 | Miller et al. | ............... 340/686.1 |
| 2011/0012858 | A1* | 1/2011 | Brookes et al. | ............... 345/173 |
| 2011/0012921 | A1* | 1/2011 | Cholewin et al. | ............. 345/619 |
| 2011/0018811 | A1* | 1/2011 | Miernik | ........................ 345/173 |
| 2011/0175805 | A1* | 7/2011 | Rottler et al. | ................. 345/156 |
| 2012/0127075 | A1* | 5/2012 | Kholaif | ........................ 345/161 |

FOREIGN PATENT DOCUMENTS

JP 2006209560 A 8/2006

* cited by examiner

*Primary Examiner* — John Kirkpatrick
(74) *Attorney, Agent, or Firm* — Hauptman Ham, LLP

(57) ABSTRACT

According to an aspect, a mobile electronic device includes a first and a second display unit, a first and a second operation detection unit, and a control unit. The first and the second display unit display a first and second operation screen respectively. The first and the second operation detection unit detect an operation for the first and second display unit respectively. The control unit performs a switching control to switch between a first state and a second state. In the first state, a display of the second display unit is deactivated and an operation detected by the second operation detection unit is processed as an operation for the first operation screen. In the second state in, a display of the first display unit is deactivated and an operation detected by the first operation detection unit is processed as an operation for the second operation screen.

14 Claims, 9 Drawing Sheets

MOBILE ELECTRONIC DEVICE WITH DUAL TOUCH DISPLAYS AND MULTITASKING FUNCTION, CONTROL METHOD, AND STORAGE MEDIUM STORING CONTROL PROGRAM

CROSS-REFERENCE TO RELATED APPLICATIONS

This application claims priority from Japanese Application No. 2011-098653, filed on Apr. 26, 2011, the content of which is incorporated by reference herein in its entirety.

BACKGROUND

1. Technical Field

The present disclosure relates to a mobile electronic device, a control method and a storage medium storing therein a control program.

2. Description of the Related Art

A multitask function is well-known which enables the user to switch and use a plurality of programs on a display unit. A mobile electronic device supporting such a multitask function displays a list of programs executed in background as a menu according to the user's operation and executes a program selected from the menu in foreground (for example, see Japanese Patent Application Laid-Open No. 2006-209560).

However, a menu operation explained above may be troublesome for some users. For the foregoing reasons, there is a need for a mobile electronic device, a control method and a control program that allow the user to switch programs easily.

SUMMARY

According to an aspect, a mobile electronic device includes a first display unit, a first operation detection unit, a second display unit, a second operation detection unit, and a control unit. The first display unit displays a first operation screen. The first operation detection unit detects an operation for the first display unit. The second display unit displays a second operation screen. The second operation detection unit detects an operation for the second display unit. The control unit performs a switching control to switch between a first state and a second state. In the first state, a display of the second display unit is deactivated and an operation detected by the second operation detection unit is processed as an operation for the first operation screen. In the second state in, a display of the first display unit is deactivated and an operation detected by the first operation detection unit is processed as an operation for the second operation screen.

According to another aspect, a control method is executed by a mobile electronic device including a first and a second display unit, and a first and a second operation detection unit. The control method includes: detecting an operation for the first display unit by the first operation detection unit; detecting an operation for the second display unit by the second operation detection unit; switching a first state and a second state; deactivating a display by the second display unit, in the first state; processing an operation detected by the second operation detection unit as an operation for an first operation screen displayed on the first display unit, in the first state; deactivating a display by the first display unit, in the second state; and processing an operation detected by the first operation detection unit as an operation for the second operation screen displayed on the second display unit, in the second state.

According to another aspect, a non-transitory storage medium stores a control program. When executed by a mobile electronic device including a first and a second display unit, and a first and a second operation detection unit, the control program causes the mobile electronic device to execute: detecting an operation for the first display unit by the first operation detection unit; detecting an operation for the second display unit by the second operation detection unit; switching a first state and a second state; deactivating a display by the second display unit, in the first state; processing an operation detected by the second operation detection unit as an operation for an first operation screen displayed on the first display unit, in the first state; deactivating a display by the first display unit, in the second state; and processing an operation detected by the first operation detection unit as an operation for the second operation screen displayed on the second display unit, in the second state.

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the mobile electronic device; however, the present invention is not limited to mobile phones. Therefore, the present invention can be applied to any type of devices provided with a touch panel, including but not limited to personal handyphone systems (PHS), personal digital assistants (PDA), portable navigation units, personal computers (including but not limited to tablet computers, netbooks etc.), media players, portable electronic reading devices, and gaming devices.

Figure 1:
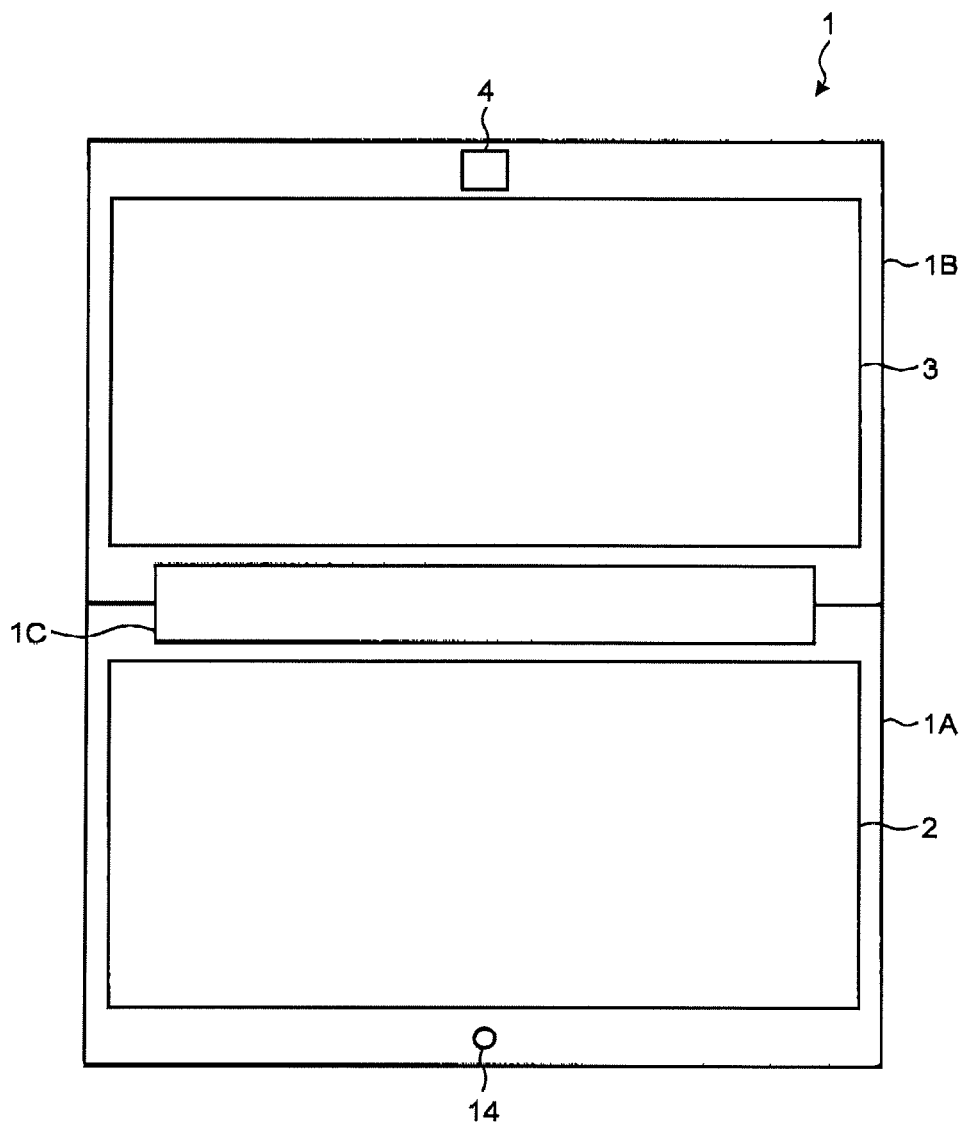
FIG. 1 is a front view of a mobile phone in a first form.
Figure 2:
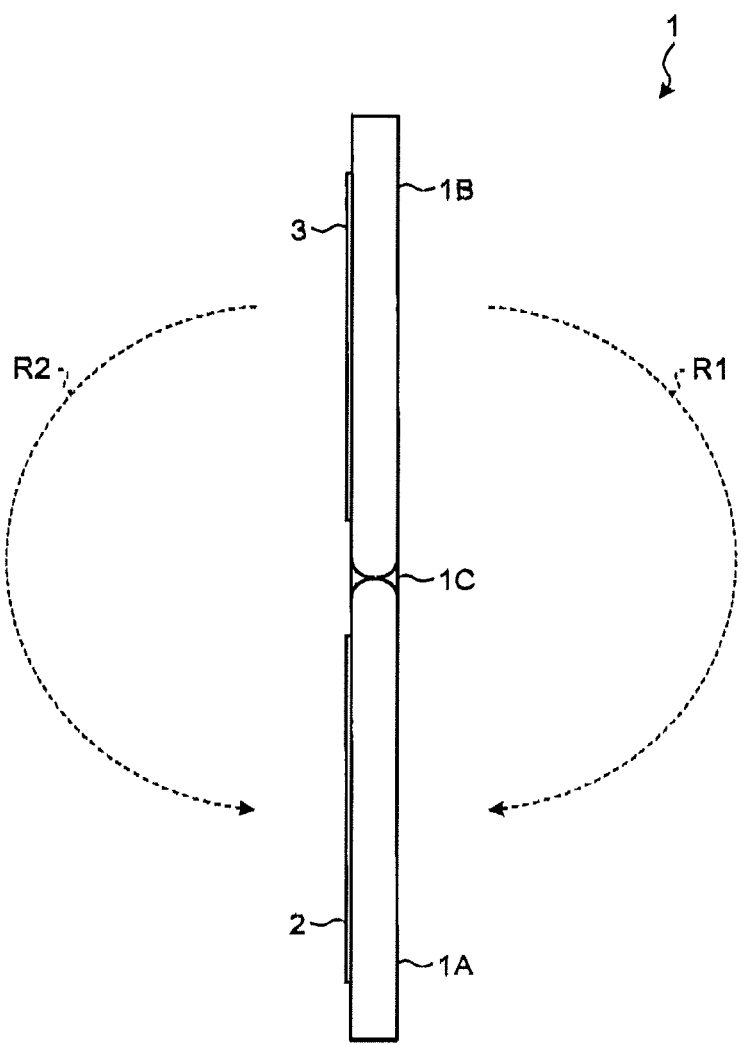
FIG. 2 is a side view of the mobile phone in the first form.
Figure 3:
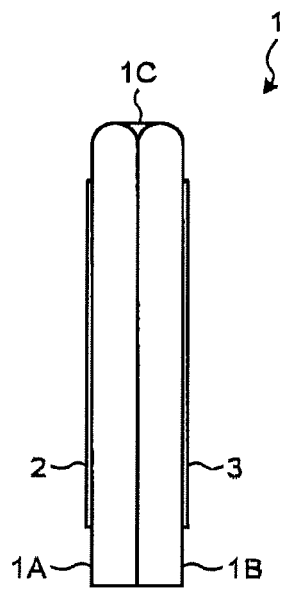
FIG. 3 is a side view of the mobile phone in a second form.
Figure 4:
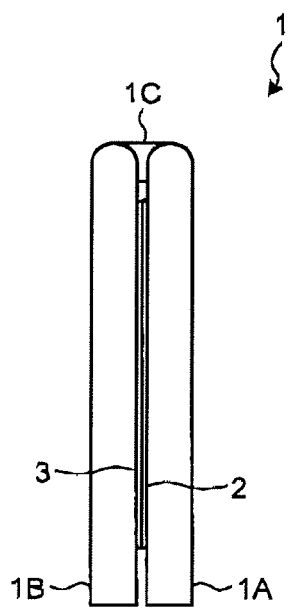
FIG. 4 is a side view of the mobile phone in a third form.

First, an overall configuration of a mobile phone 1 as an embodiment of an electronic device will be explained. FIG. 1 is a front view of the mobile phone 1 in the first form. FIG. 2 is a side view of the mobile phone 1 in the first form. FIG. 3 is a side view of the mobile phone 1 in the second form. FIG. 4 is a side view of the mobile phone 1 in the third form.

For example, as illustrated in FIG. 1, the mobile phone 1 has a first housing 1A, a second 1B and a connection unit 1C. The first housing 1A has a touch panel 2 and a proximity sensor 14. The second housing 1B has a touch panel 3 and an imaging unit 4. The imaging unit 4 electronically obtains an image using an imaging sensor. The proximity sensor 14 detects that an object is present within a predetermined distance, using, for example, electromagnetic induction or capacitance.

The touch panel 2 is provided in one of faces with the widest area in the first housing 1A. The touch panel 2 displays, for example, a character, a graphic or an image, and detects various operations performed for the touch panel 2 using a finger, a stylus or a pen (in the description herein below, for the sake of simplicity, it is assumed that the user touches the touch panel 2 with his/her finger(s)). The touch panel 3 is provided in one of faces with the widest area in the second housing 1B. The touch panel 3 displays, for example, a character, a graphic or an image, and detects various operations performed for the touch panel 3 using a finger, a stylus or a pen (in the description herein below, for the sake of simplicity, it is assumed that the user touches the touch panel 3 with his/her finger(s)). The detection method of the touch screen 2 and the touch screen 3 may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method.

The connection unit 1C connects the first housing 1A and the second housing 1B and functions as a rotation axis to relatively rotate the first housing 1A and the second housing 1B. The mobile phone 1 is transformed to a second form illustrated in FIG. 3 by rotating the second housing 1B by approximately 180 degree in direction R1 illustrated in FIG. 2 using the connection unit 1C as a rotation axis. Moreover, the mobile phone 1 is transformed to a third form illustrated in FIG. 4 by rotating the second housing 1B by approximately 180 degree in direction R2 illustrated in FIG. 2 using the connection unit 1C as a rotation axis. Thus, the mobile telephone 1 is transformed to any of the first form, the second form and the third form by relatively rotating the first housing 1A and the second housing 1B.

When the mobile phone 1 is in the first form as illustrated in FIG. 1 and FIG. 2, the touch panel 1, the touch panel 3, the imaging unit 4 and the proximity sensor 14 are faced in substantially the same direction and exposed on the surface of the mobile phone 1. In such the first form, the mobile phone 1 can display respective program operation screens on the touch panel 2 and the touch panel 3. For example, the mobile telephone 1 can display an email composition screen provided by an email program on the touch panel 2 and display a WEB page browse screen provided by a browser program on the touch panel 3.

In the first form, based on the user operation, it is determined which program operation screen is displayed on the touch panel 2 and the touch panel 3. That is, by operating the mobile phone 1 in the first form, the user can display respective arbitrary program operation screens on the touch panel 2 and the touch panel 3. An "operation screen" denotes a screen to accept some kind of operation.

The mobile phone 1 in the first form may control the touch panel 2 and the touch panel 3 as one connected display unit and display an operation screen provided by one program over the touch panel 2 and the touch panel 3. The mobile phone 1 in the first form may set one of the touch panel 2 and the touch panel 3 to a power saving state and display an operation screen only on the other.

When the mobile phone 1 is in the second form as illustrated in FIG. 3, the touch panel 2 and the touch panel 3 are faced in substantially the opposite direction and exposed on the surface of the mobile phone 1. In such the second form, the mobile phone 1 reduces the power consumption by deactivating a touch panel display on the side invisible from the user.

Moreover, the mobile phone 1 in the second form processes an operation for the touch panel on the side invisible from the user, as an operation for the touch panel on the side visible from the user. By converting an operation in this way, the user can operate an operation screen without obstructing the operation screen by a finger. Operations of the mobile phone 1 in the second form will be described below in detail.

When the mobile phone 1 is in the third form as illustrated in FIG. 4, the touch panel 2 and the touch panel 3 are faced each other and cannot be seen from the outside. In such the third form, the mobile phone 1 deactivates the functions of the touch panel 2 and the touch panel 3. That is, the mobile phone 1 reduces the power consumption by deactivating the functions as the display unit and the operation unit of the touch panel 2 and the touch panel 3. To further reduce the power consumption, in conjunction with transformation to the third form, if there is an operation screen displayed on the screen of the touch panel 2 or the touch panel 3, an execution of the program corresponding to the operation screen may be stopped.

In the third form, it is possible to suppress the power consumption and protect the touch panel 2 and the touch panel 3 from physical damage, so that it is suitable to a case where the mobile phone 1 is not used or the mobile phone is carried. FIG. 4 illustrates that the touch panel 2 and the touch panel 3 come in contact with each other in the third form; however, the mobile phone 1 may be configured such that the touch panel 2 and the touch panel 3 are faced with a gap in the third form.

Figure 5:
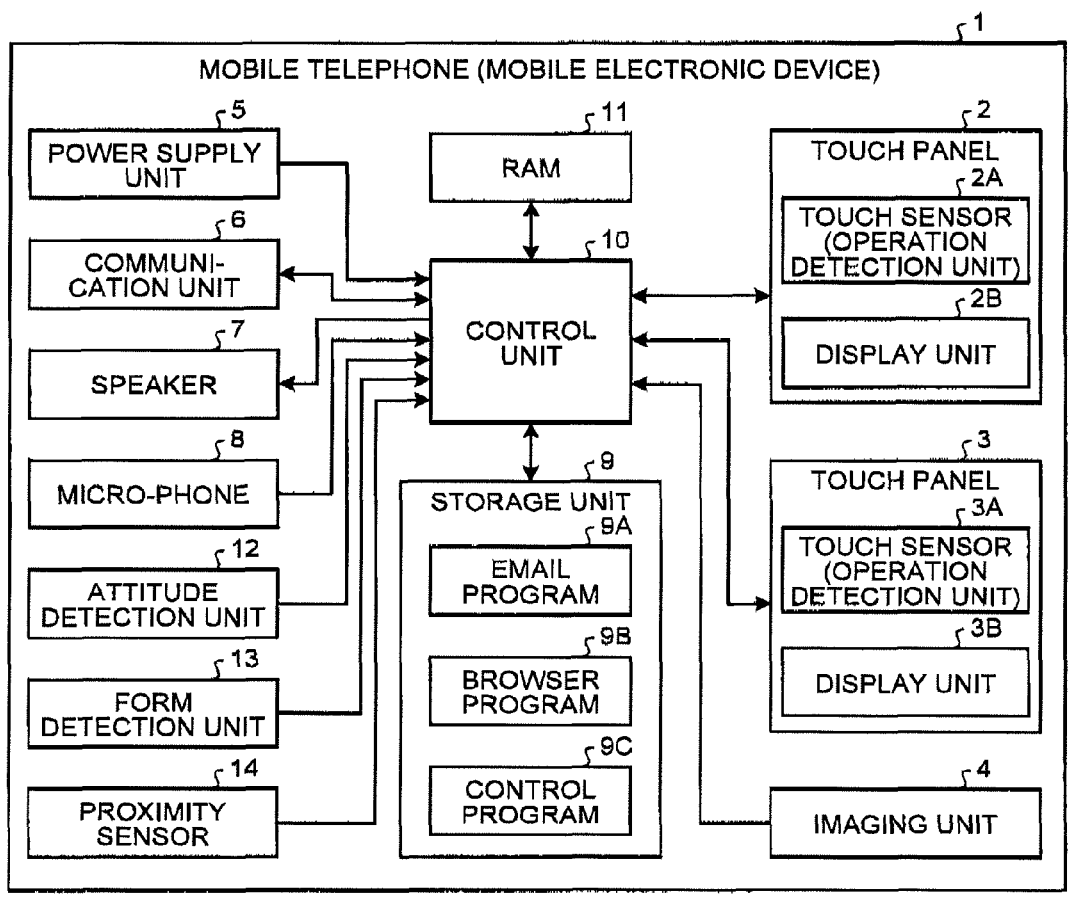
FIG. 5 is a block diagram of the mobile phone.

Next, a functional configuration of the mobile phone 1 will be explained with reference to FIG. 5. FIG. 5 is a block diagram of the mobile phone 1. As illustrated in FIG. 5, the mobile phone 1 has the touch panel 2, the touch panel 3, the imaging unit 4, a power supply unit 5, a communication unit 6, a speaker 7, a microphone 8, a storage unit 9, a control unit 10, an RAM (random access memory) 11, an attitude detection unit 12, a form detection unit 13, and the proximity sensor 14. Except for the touch panel 2 provided in the first housing 1A and the touch panel 3 provided in the second housing 1B, each component may be provided in any of the first housing 1A and the second housing 1B.

The touch panel 2 has a display unit 2B and a touch sensor (operation detection unit) 2A overlapping with the display unit 2B. The touch sensor 2A detects various operations performed for the surface of the touch panel 2 using finger(s) as well as positions on the touch panel 2 where the operations are performed, and informs the control unit 10 thereof. The operations detected in the touch sensor 2A include a tap operation and a swipe operation. The display unit 2B is configured with, for example, a liquid crystal display (LCD) or an organic electro-luminance display (OELD), and displays, for example, a character and a graphic.

The touch panel 3 has a display unit 3B and a touch sensor (operation detection unit) 3A overlapping with the display unit 3B. The touch sensor 3A detects various operations performed for the surface of the touch panel 3 using finger(s) as well as positions on the touch panel 3 where the operations are performed, and informs the control unit 10 thereof. The operations detected in the touch sensor 3A include a tap operation and a swipe operation. The display unit 3B is configured with, for example, a LCD or an OELD, and displays, for example, a character and a graphic.

It should be noted that, in the following, the touch sensor 2A may be referred to as "first operation detection unit" and the touch sensor 3A may be referred to as "second operation detection unit." Also, in the following, the display unit 2B may be referred to as "first display unit" and the display unit 3B may be referred to as "second display unit."

The imaging unit 4 electronically obtains an image using an imaging sensor, converts the obtained image into signals, and transmits them to the control unit 10. The power supply unit 5 supplies power obtained from a rechargeable battery or an external power supply, to each functional unit of the mobile phone 1 including the control unit 10. The communication unit 6 establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 6. The speaker 7 outputs sound signals transmitted from the control unit 10, as sound. The microphone 8 converts, for example, the user's voice into sound signals and transmits them to the control unit 10.

The attitude detection unit 12 detects an attitude (direction) change of the mobile phone 1 and informs the control unit 10 of the detection result. The attitude detection unit 12 uses, for example, an acceleration sensor and/or a gyro sensor to detect the attitude change of the mobile phone 1. The form detection unit 13 detects a form change of the mobile phone 1 and informs the control unit 10 of the detection result. The form detection unit 13 uses, for example, various sensors or a mechanical switch to detect the form change of the mobile phone 1. The proximity sensor 14 transmits a predetermined signal to the control unit 10 when it is detected that an object is present within a predetermined distance.

The storage unit 9 includes one or more non-transitory storage medium, for example, a nonvolatile memory (such as ROM, EPROM, flash card etc.) and/or a storage device (such as magnetic storage device, optical storage device, solid-state storage device etc.), and stores programs and data used for processing by the control unit 10. The programs stored in the storage unit 9 include an email program 9A, a browser program 9B and a control program 9C. Moreover, the storage unit 9 stores various programs such as an operating system program to realize a basic function of the mobile phone 1, and various data such as address book data. The storage unit 9 may be configured as a combination of a portable non-transitory storage medium such as a memory card or an optical disc and a reading apparatus of the storage medium.

The email program 9A provides a function for realizing a composition, transmission, reception, and browse of an email. The browser program 9B provides a function for realizing a browse of a Web page. The control program 9C controls the operation of each unit of the mobile phone 1 according to the detection result of each detection unit. For example, the control program 9C controls the operations of the touch panel 2 and the touch panel 3 as described above, according to the form change detected in the form detection unit 13.

The control unit 10 is a processing device such as a central processing unit (CPU). The control unit 10 realizes various functions by integrally controlling the operations of the mobile phone 1. Specifically, the control unit 10 refers the data stored in the storage unit 9 and the detection result of each detection unit as necessary, executes orders included in the programs stored in the storage unit 9, and controls, for example, the touch panel 2 and the communication unit 6. The executed programs and the referred data by the control unit 10 may be downloaded from a server by wireless communication by the communication unit 6.

For example, the control unit 10 realizes an email edit function, email browse function or the like, by executing the email program 9A. Further, by executing the control program 9C, the control unit 10 realizes a function of controlling the operations of the touch panel 2 and the touch panel 3 according to a form change of the mobile phone 1. It is assumed that the control unit 10 can execute a plurality of programs in parallel by a multitask function provided by the operating system program.

The RAM 11 is used as a storage area in which, for example, the program orders to be executed by the control unit 10, the data to be referred by the control unit 10, and the computation result in the control unit 10 are temporarily stored.

Figure 6:
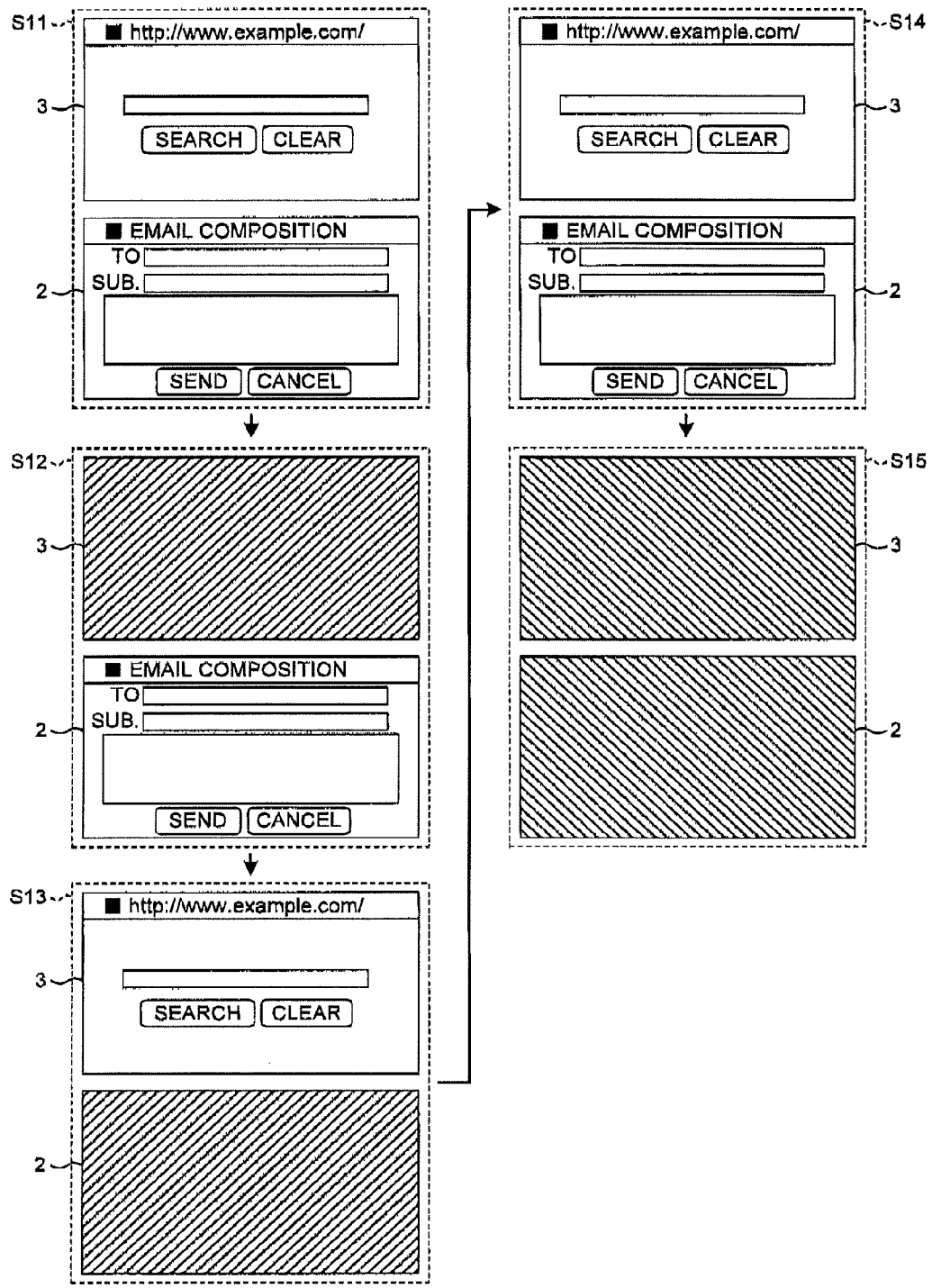
FIG. 6 is a diagram for explaining operations of the mobile phone in the second form.

Next, operations of the mobile phone 1 in the second form will be explained with reference to FIG. 6. FIG. 6 is a diagram for explaining the operations of the mobile phone 1 in the second form. At step S11 illustrated in FIG. 6, the mobile phone 1 is in the first form. The touch panel 2 displays an email composition screen provided by the email program 9A, and the touch panel 3 displays a WEB page browse screen provided by the browser program 9B.

In this state, an operation detected in the touch panel 2 is processed by the control unit 10 as an operation for the email composition screen displayed on the touch panel 2. Also, an operation detected in the touch panel 3 is processed by the control unit 10 as an operation for the WEB page browse screen displayed on the touch panel 3.

A case is assumed where the user folds back the second housing 1B having the touch panel 3 to the opposite side and transforms the mobile phone 1 to the second form. When transformation from the first form to the second form is detected by the form detection unit 13, the control unit 10 decides which of the touch panel 2 and the touch panel 3 is positioned on the user side. Then, the control unit 10 deactivates a display on the opposite side to the touch panel decided to be positioned on the user side, that is, the control unit 10 deactivates a display of a touch panel on the side invisible from the user.

At step S12 illustrated in FIG. 6, since the touch panel 2 is positioned on the user side and the touch panel 3 is positioned on the side invisible from the user, the control unit 10 deactivates a display of the touch panel 3. The display deactivation is realized by, for example, stopping a power supply to the display unit 3B forming the touch panel 3. Thus, by deactivating a display of the touch panel on the side invisible from the user, it is possible to suppress power consumption without impairing the user convenience.

Moreover, in coordination with the transformation to the second form, the control unit 10 suspends an execution of a program displaying the operation screen on the touch panel on which the display is deactivated. Thus, by suspending an execution of the program whose operation screen is not displayed, it is possible to further improve an effect of suppressing power consumption.

Further, in coordination with the transformation to the second form, the control unit 10 processes an operation for one touch panel on which the display is deactivated, as an operation for an operation screen displayed on the other touch panel. That is, in the case of step S12 in FIG. 6, the control unit 10 deactivates the display unit 3B of the touch panel 3 and sets the touch sensor 3A in an active state. Then, the control unit 10 processes an operation detected in the touch sensor 3A as an operation for the email composition screen displayed on the touch panel 2.

For example, when the touch sensor 3A detects a tap operation for a position corresponding to a position immediately below the transmission button on the email composition screen (i.e. the reverse-side position to the transmission button), the control unit 10 processes it as a tap operation for the transmission button on the email composition screen. In order to process an operation for one touch panel on which the display is deactivated as an operation for the operation screen displayed on the other touch panel, the control unit 10 converts the coordinate on which the operation is detected in the touch panel on which the display is deactivated, to the coordinate on the touch panel on which the operation screen is displayed.

Thus, by converting an operation for a touch panel on which the display is deactivated, the user can operate an operation screen without obstructing the operation screen by a finger. In the second form, the touch sensor of a touch panel on the side on which the display continues may be deactivated or may be activated to detect an operation. When the user operates a touch panel on the invisible side, compared to a case of operating a touch panel on the front side, it is difficult to accurately operate an intended position. Therefore, in the case of operating the touch panel on the side on which the display is deactivated, an area in which a button or the like is decided to be operated is set wider than that of the touch panel on the side on which the operation screen is displayed.

The control unit 10 decides which of the touch panel 2 and the touch panel 3 is positioned on the user side, for example, based on a detection result of the attitude detection unit 12. Normally, the user holds and uses the mobile phone 1 in a position under his/her eyes. Therefore, based on the detection result of the attitude detection unit 12, the control unit 10 decides that a touch panel judged to be closer to the upper direction is positioned on the user side. Thus, the control unit 10 can decide at high probability which touch panel is positioned on the user side.

Normally, it is considered that the user is present nearby the mobile phone 1. Therefore, the control unit 10 may decide which of the touch panel 2 and the touch panel 3 is positioned on the user side based on a detection result of the proximity sensor 14. When the proximity sensor 14 is provided together with the touch panel 2 in the same housing toward substantially the same direction as illustrated in FIG. 1, it is decided that the touch panel 2 is positioned on the user side if the proximity sensor 14 detects any object, and that the touch panel 3 is positioned on the user side if the proximity sensor 14 does not detect any object. The mobile phone 1 may be provided with the proximity sensors 14 in both the first housing 1A and the second housing 1B. In this case, the control unit 10 may decide, as the user side, the side on which an object is detected in a closer position. In the case of using the proximity sensor 14, the sensitivity of the proximity sensor 14 may be temporarily enhanced to decide whether an object is present within a predetermined range when transformation to the second form is detected, and then the proximity sensor 14 may be deactivated. Thus, it is possible to suppress an increase of power consumption while improving the probability to decide the user side correctly.

In the case where a touch sensor is deactivated on the side on which an operation screen is displayed in the second form, the control unit 10 may decide that a touch panel on the opposite side to the side on which an operation is detected first after transformation to the second form is detected, is positioned on the user side. This is because, when the touch sensor on the side on which the operation screen is displayed is deactivated in the second form, it is considered that, first, the user touches a touch panel on the invisible side for operation.

Alternatively, the control unit 10 may decide which of the touch panel 2 and the touch panel 3 is positioned on the user side, for example, based on whether the user is captured in an image obtained by the imaging unit 4. The control unit 10 may decide the user side based on a result of detecting the user's way of holding the mobile phone 1 by some sensor.

Thereafter, it is assumed that the user turns over the mobile phone 1 in the second form and holds the mobile phone 1 such that the touch panel 3 is on the user side. If the attitude detection unit 12 detects that the attitude of the mobile phone 1 is reversed, the control unit 10 deactivates a display of a touch panel on which an operation screen has been displayed, and suspends an execution of a program displaying the operation screen on the touch panel. Further, the control unit 10 activates a display of a touch panel on which the display has been deactivated, and resumes an execution of a program corresponding to the touch panel. When the mobile phone 1 rotates in the horizontal direction with respect to the touch panel 2 and the touch panel 3, it is not decided that the attitude of the mobile phone 1 is reversed.

At step S13 illustrated in FIG. 6, by reversing the attitude of the mobile phone 1, the control unit 10 deactivates the display of the touch panel 2 and suspends an execution of the email program 9A displaying the email composition screen on the touch panel 2. Moreover, the control unit 10 activates a display of the touch panel 3 and resumes an execution of the browser program 9B to display the WEB page browse screen on the touch panel 3.

Further, in coordination with the attitude reverse of the mobile phone 1, the control unit 10 processes an operation for one touch panel on which the display is deactivated, as an operation for the operation screen displayed on the other touch panel. That is, in the case of step S13 illustrated in FIG. 6, the control unit 10 deactivates the display unit 2B of the touch panel 2 and sets the touch sensor 2A in an active state. Then, the control unit 10 processes an operation detected in the touch sensor 2A as an operation for the WEB page browse screen displayed on the touch panel 3.

For example, when a swipe operation in the upper direction is detected by the touch sensor 2A, the control unit 10 scrolls the WEB page browse screen displayed on the touch panel 3 in the upper direction. When a swipe operation in the lower direction is detected by the touch sensor 2A, the control unit 10 scrolls the WEB page browse screen displayed on the touch panel 3 in the lower direction.

Thus, by switching a program execution environment according to an attitude change of the mobile phone 1, the user can easily switch and use a plurality of programs. Also, a display unit and program on the unused side are deactivated, so that it is possible to reduce power consumption.

Regarding a decision as to whether the attitude of the mobile phone 1 is reversed, it is not necessary to detect that the attitude of the mobile phone 1 accurately rotates by 180 degree, and it may be decided that the attitude of the mobile phone 1 is reversed when the attitude of the mobile phone 1 changes over a predetermined angle within a predetermined time period. When it is decided based on a detection result of the attitude detection unit 12 that a touch panel judged to be closer to the upper direction is positioned on the user side, it may be decided that the attitude of the mobile phone 1 is reversed when the touch panel judged to be closer to the upper direction is switched.

Although the top and bottom of the touch panels of the mobile phone 1 are reversed depending on a way of reversing the attitude of the mobile phone 1, it is possible to adjust the upper and lower direction of an operation screen such that the operation screen is displayed in an appropriate direction according to a detection result of the attitude detection unit 12.

Thereafter, it is assumed that the user unfolds the first housing 1A having the touch panel 2 to the front side and transforms the mobile phone 1 to the first form. If the form detection unit 13 detects the transformation from the second form to the first form, the control unit 10 activates a display of a touch panel on which the display has been deactivated, and resumes an execution of a program to provide the operation screen to the touch panel. At step S14 illustrated in FIG. 6, since the mobile phone 1 is transformed to the first form, the control unit 10 activates the display of the touch panel 2 and resumes an execution of the email program 9A to display the email composition screen on the touch panel 2.

Further, in coordination with the transform of the mobile phone 1 to the first form, the control unit 10 processes operations for each of the touch panels as operations for the operation screen displayed on the touch panel. In the case of step S14 illustrated in FIG. 6, an operation detected by the touch panel 2 is processed by the control unit 10 as an operation for the email composition screen displayed on the touch panel 2. Also, an operation detected by the touch panel 3 is processed by the control unit 10 as an operation for the WEB page browse screen displayed on the touch panel 3.

Thus, by transformation from the second form to the first form, the mobile phone 1 functions in the same way as in the stage of step S11.

Thereafter, it is assumed that the user folds back the second housing 1B having the touch panel 3 to the front side and transforms the mobile phone 1 to the third form. If the form detection unit 13 detects the transformation from the first form to the third form, the control unit 10 deactivates the touch panel 2 and the touch panel 3 as illustrated at step S15 in FIG. 16. In this case, the touch sensor 2A and the touch sensor 3A are deactivated.

Further, in coordination with the transformation from the first form to the third form, the control unit 10 suspends an execution of the programs providing the operation screens to the touch panels. It is preferable to resume an execution of the suspended programs when the form detection unit 13 detects the transformation from the third form to the first form.

Figure 7:
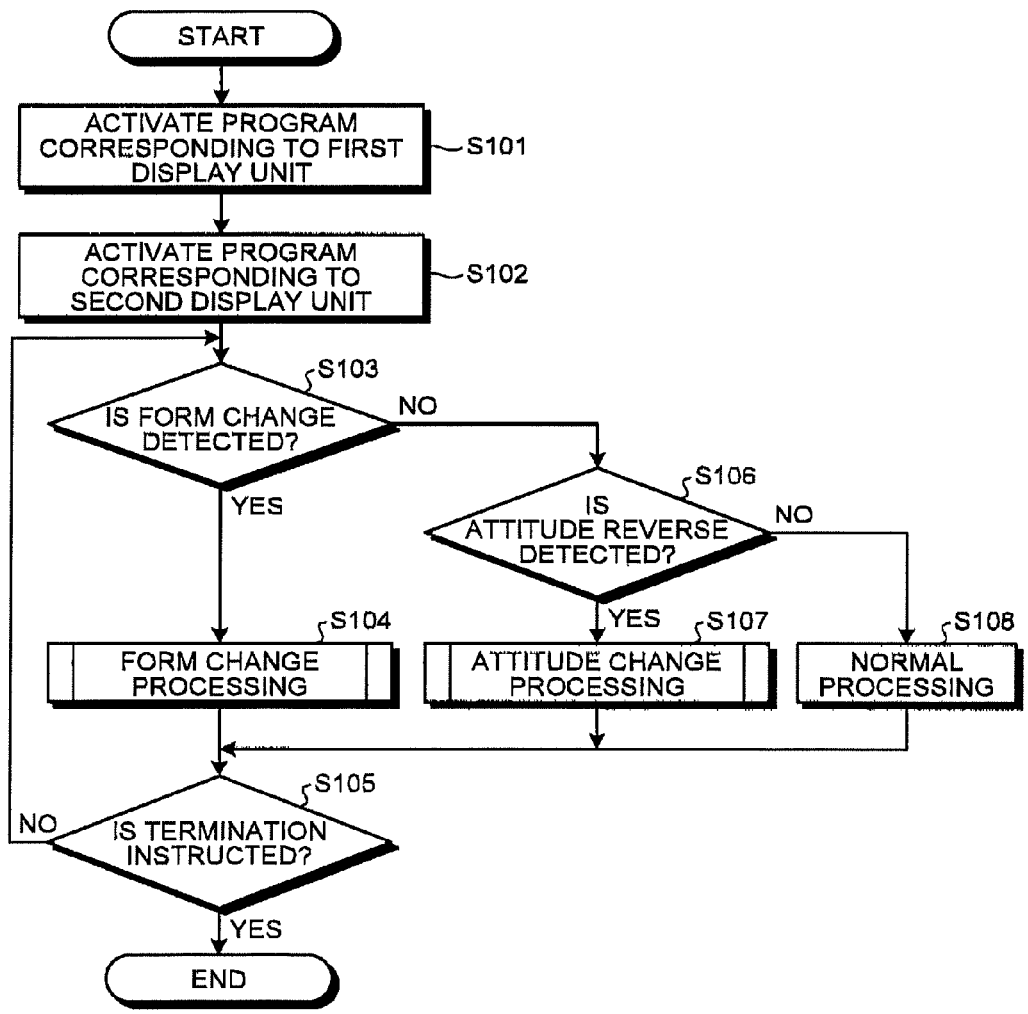
FIG. 7 is a flowchart illustrating operations of the mobile phone in a case where a plurality of programs are executed thereon.
Figure 8:
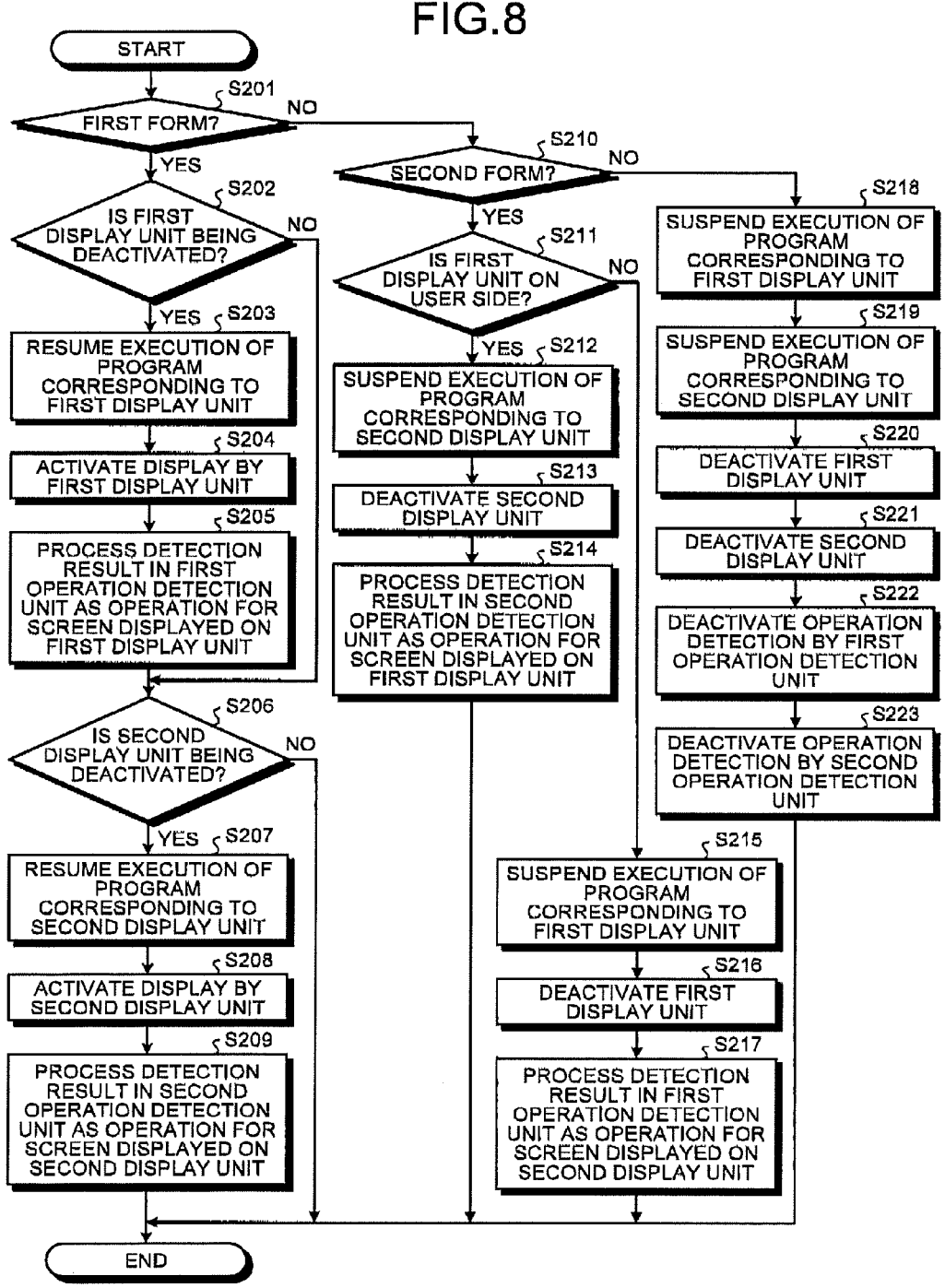
FIG. 8 is a flowchart illustrating processing process of form change processing.
Figure 9:
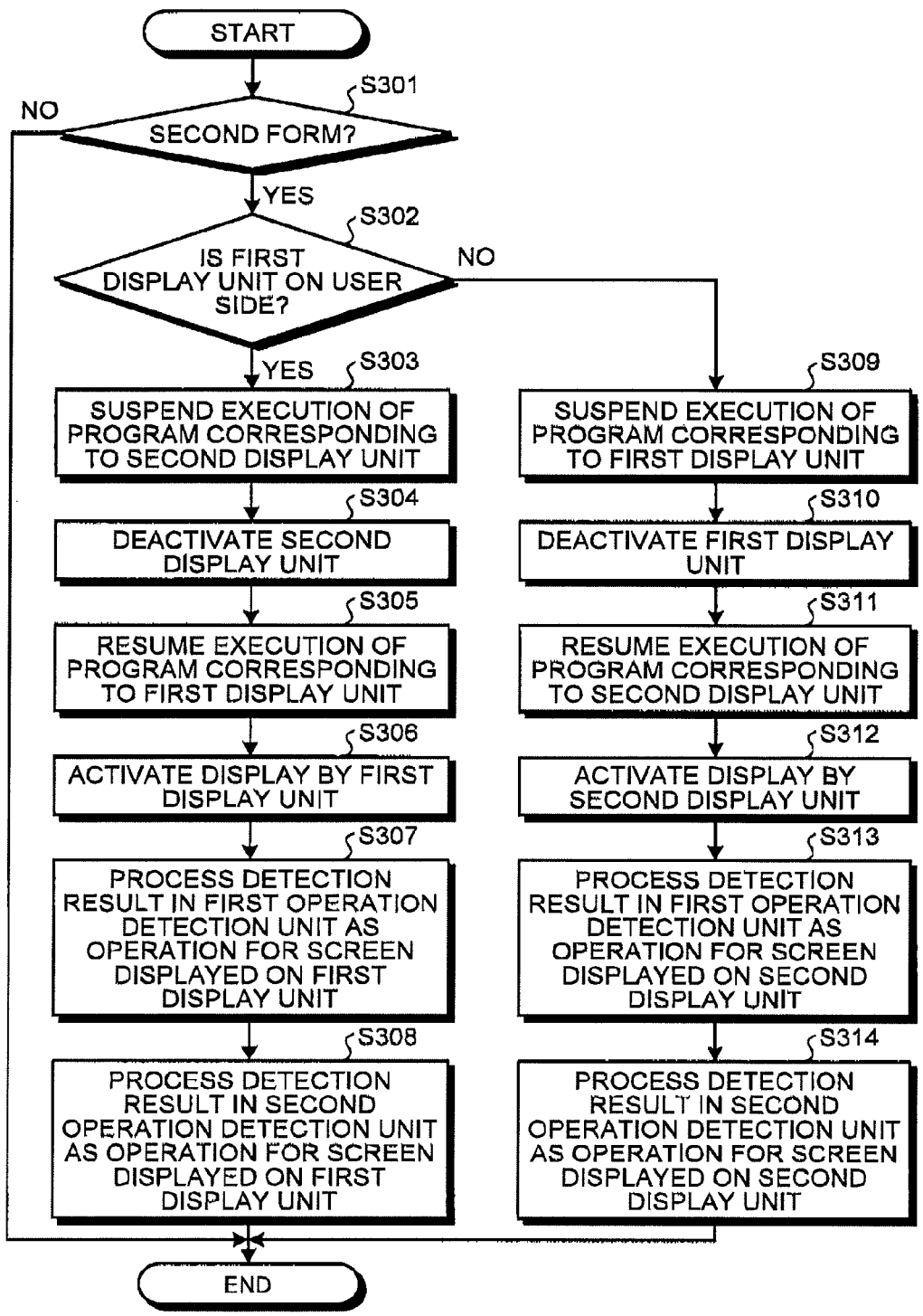
FIG. 9 is a flowchart illustrating processing process of attitude change processing.

Next, operations of the mobile phone 1 in the case of executing a plurality of programs will be explained with reference to FIG. 7 to FIG. 9. FIG. 7 is a flowchart illustrating operations of the mobile phone 1 in the case where a plurality of programs are executed thereon. FIG. 8 is a flowchart illustrating processing process of form change processing. FIG. 9 is a flowchart illustrating processing process of attitude change processing. The operations illustrated in FIG. 7 to FIG. 9 are realized through execution of the control program 9C by the control unit 10.

As illustrated in FIG. 7, at step S101, the control unit 10 of the mobile phone 1 activates a program corresponding to the first display unit (i.e. display unit 2B) according to, for example, the user instruction. Also, at step S102, the control unit 10 activates a program corresponding to the second display unit (i.e. display unit 3B) according to, for example, the user instruction.

Then, at step S103, the control unit 10 decides whether the form detection unit 13 detects a form change of the mobile phone 1. When the form change of the mobile phone 1 is detected ("Yes" at step S103), the control unit 10 performs form change processing described later, at step S104. Subsequently, if a termination instruction is performed ("Yes" at step S105), the control unit 10 terminates a series of processing steps. If the termination instruction is not performed ("No" at step S105), the control unit 10 performs step S103 and the subsequent steps again.

If the form change of the mobile phone 1 is not detected ("No" at step S103), at step S106, the control unit 10 decides whether the attitude reverse of the mobile phone 1 is detected by the attitude detection unit 12. If the attitude reverse of the mobile phone 1 is detected ("Yes" at step S106), at step S107, the control unit 10 performs attitude change processing described below. Subsequently, if the termination instruction is performed ("Yes" at step S105), the control unit 10 terminates a series of processing steps. If the termination instruction is not performed ("No" at step S105), the control unit 10 performs step S103 and the subsequent steps again.

If the attitude reverse of the mobile phone 1 is not detected ("No" at step S106), at step S108, the control unit 10 performs normal processing based on, for example, a detected operation. Subsequently, if the termination instruction is performed ("Yes" at step S105), the control unit 10 terminates a series of processing steps. If the termination instruction is not performed ("No" at step S105), the control unit 10 performs step S103 and the subsequent steps again.

As illustrated in FIG. B, in the form change processing, first, at step S201, the control unit 10 decides whether the transformed form is the first form. A case where the transformed form is the first form means that the form before the transformation is the second form (i.e. in a state in which a display of one touch panel is deactivated) or the third form (i.e. in a state where a display of both touch panels is deactivated).

If the transformed form is the first form ("Yes" at step S201), at step S202, the control unit 10 decides whether the first display unit is being deactivated. If the first display unit is being deactivated ("Yes" at step S202), the control unit 10 resumes an execution of the program corresponding to the first display unit at step S203 and activates a display by the first display unit at step S204. Further, at step S205, the control unit 10 starts to process a detection result of the first operation detection unit (i.e. touch sensor 2A) as an operation for the screen displayed on the first display unit. If the first display unit is not being deactivated ("No" at step S202), steps S203 to S205 are not performed.

Subsequently, at step S206, the control unit 10 decides whether the second display unit is being deactivated. If the second display unit is being deactivated ("Yes" at step S206), the control unit 10 resumes an execution of the program corresponding to the second display unit at step S207 and activates a display by the second display unit at step S208. Further, at step S209, the control unit 10 starts to process a detection result of the second operation detection unit (i.e. touch sensor 3A) as an operation for the screen displayed on the second display unit. If the second display unit is not being deactivated ("No" at step S206), steps S207 to S209 are not performed. Then, the control unit 10 terminates the form change processing.

If the transformed form is not the first form ("No" at step S201), at step S210, the control unit 10 decides whether the transformed form is the second form. A case where the transformed form is the second form means that the form before the transformation is the first form (i.e. in a state in which a display of both touch panels is performed).

If the transformed form is the second form ("Yes" at step S210), at step S211, the control unit 10 decides whether the first display unit is positioned on the user side. If the first display unit is positioned on the user side ("Yes" at step S211), the control unit 10 suspends an execution of the program corresponding to the second display unit at step S212 and deactivates a display by the second display unit at step S213. Further, at step S214, the control unit 10 starts to process a detection result of the second operation detection unit as an operation for the screen displayed on the first display unit. Then, the control unit 10 terminates the form change processing.

By contrast, if the first display unit is not positioned on the user side ("No" at step S211), the control unit 10 suspends an execution of the program corresponding to the first display unit at step S215 and deactivates a display by the first display unit at step S216. Further, at step S217, the control unit 10 starts to process a detection result of the first operation detection unit as an operation for the screen displayed on the second display unit. Then, the control unit 10 terminates the form change processing.

If the transformed form is neither the first form nor the second form ("No" at step S210), the control unit 10 performs the following processing steps. A case where the transformed form is neither the first form nor the second form means that the transformed form is the third form and the form before the transformation is the first form (i.e. in a state in which a display of both touch panels is performed).

In this case, the control unit 10 suspends an execution of the program corresponding to the first display unit at step S218 and suspends an execution of the program corresponding to the second display unit at step S219. Subsequently, the control unit 10 deactivates the display by the first display unit at step S220 and deactivates the display by the second display unit at step S221. Further, the control unit 10 deactivates the operation detection in the first operation detection unit at step S222 and deactivates the operation detection in the second operation detection unit at step S223. Then, the control unit 10 terminates the form change processing.

As illustrated in FIG. 9, in the pose change processing, first, at step S301, the control unit 10 decides whether the current form of the mobile phone 1 is the second form. If the current form is not the second form ("No" at step S301), the control unit 10 terminates the attitude change processing without particular processing.

If the current form is the second form ("Yes" at step S301), at step S302, the control unit 10 decides whether the first display unit is positioned on the user side in the transformed form. If the first display unit is positioned on the user side ("Yes" at step S302), the control unit 10 suspends an execution of the program corresponding to the second display unit at step S303 and deactivates the display by the second display unit at step S304. Also, the control unit 10 resumes an execution of the program corresponding to the first display unit at step S305 and activates the display by the first display unit at step S306.

Further, at step S307, the control unit 10 starts to process a detection result of the first operation detection unit as an operation for the screen displayed on the first display unit. At step S308, the control unit 10 starts to process a detection result of the second operation detection unit as an operation for the screen displayed on the first display unit. Then, the control unit terminates the attitude change processing.

Meanwhile, if the second display unit is positioned on the user side ("No" at step S302), the control unit 10 suspends an execution of the program corresponding to the first display unit at step S309 and deactivates the display by the first display unit at step S310. Also, the control unit 10 resumes an execution of the program corresponding to the second display unit at step S311 and activates the display by the second display unit at step S312.

Further, at step S313, the control unit 10 starts to process a detection result of the first operation detection unit as an operation for the screen displayed on the second display unit. At step S314, the control unit 10 starts to process a detection result of the second operation detection unit as an operation for the screen displayed on the second display unit. Then, the control unit 10 terminates the attitude change processing.

As described above, in the present embodiment, an executable program is switched according to an attitude change of the mobile phone 1, so that the user can easily switch an executable program.

The aspect of the present invention explained in the above embodiments can be arbitrarily modified without departing from the scope of the present invention. For example, the control program 9C may be divided into a plurality of modules or may be integrated with other programs.

Figure 10:
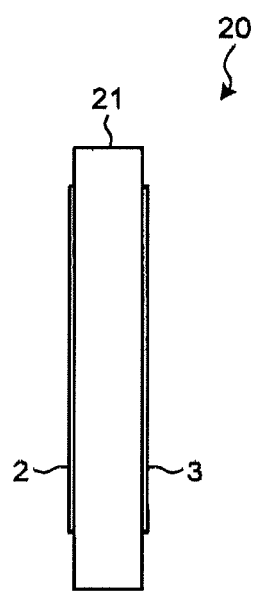
FIG. 10 is a side view illustrating an example of another mobile electronic device.

The above embodiment has described the mobile phone transformed to the first form, the second form, and the third form as an example; however, an applicable target of the present invention is not limited to a mobile electronic device having such a transformable housing. For example, the present invention is equally applicable to a mobile electronic device such as the mobile electronic device 20 illustrated in FIG. 10 in which the touch panel 2 is provided on one of housing surfaces without form changes and the touch panel 3 is provided on the opposite-side surface. In this case, the attitude change processing illustrated in FIG. 9 is performed but the form change processing illustrated in FIG. 8 is not performed.

The above embodiment has described an example where two programs are switched and executed according to an attitude change of the mobile phone 1; however, three or more programs may be switched and executed according to an attitude change of the mobile phone 1. For example, it is possible to manage programs whose execution is suspended to execute other programs, in a layered manner according to the activation order or the like, so that a program display an operation screen is switched according to an attitude change of the mobile phone 1.

In this case, when the mobile phone 1 is reversed in the clockwise rotation, the highest-order program of the layer may be resumed to display an operation screen on a touch panel on the user side, and a program that has displayed an operation screen on a touch panel moved to the back side may be shifted to the lowest order of the layer. Also, in a case where the mobile phone 1 is reversed in the counterclockwise rotation, the lowest-order program of the layer may be resumed to display an operation screen on a touch panel on the user side, and a program that has displayed an operation screen on a touch panel moved to the back side may be shifted to the highest order of the layer. Thus, a program switching manner may be changed according to a rotation direction.

The advantages of one embodiment of the invention are that the user is allowed to switch programs easily.

What is claimed is:

1. A mobile electronic device, comprising:
a first display unit configured to display a first operation screen;
a first operation detection unit configured to detect a touch operation on the first display unit;
a second display unit configured to display a second operation screen;
a second operation detection unit configured to detect a touch operation on the second display unit; and
a control unit configured to perform a switching control to switch between a first state and a second state, wherein in the first state, the control unit is configured to deactivate a display of the second operation screen on the second display unit, and when a touch operation on the second display unit is detected by the second operation detection unit, to convert coordinates of a position of the touch operation on the second display unit into coordinates on the first operation screen and process the touch operation detected on the second display unit as an operation for the first operation screen, in the second state, the control unit is configured to deactivate a display of the first operation screen on the first display unit, and when a touch operation on the first display unit is detected by the first operation detection unit, to convert coordinates of a position of the touch operation on the first display unit into coordinates on the second operation screen and process the touch operation detected on the first display unit as an operation for the second operation screen, and the control unit is further configured to set a first detecting area in the first operation screen, for detecting a first operation, and a second detecting area in the second operation screen, for detecting a second operation corresponding to said first operation, wherein in the first state, the second detecting area is wider than the first detecting area, and in the second state, the first detecting area is wider than the second detecting area.

2. The mobile electronic device according to claim 1, further comprising:

a first housing including the first display unit and the first operation detection unit;

a second housing including the second display unit and the second operation detection unit; and a connection unit configured to connect the first housing and the second housing, wherein the connection unit is configured to transform the first housing and the second housing between a first form in which a first display surface of the first display unit and a second display surface of the second display unit face toward substantially a same direction, and a second form in which the first display surface of the first display unit and the second display surface of the second display unit face away from each other in opposite directions.

3. The mobile electronic device according to claim 2, wherein the control unit is configured to perform the switching control in a case where the first housing and the second housing are transformed to the second form, and to perform a control, in a case where the first housing and the second housing are transformed to the first form, so that a touch operation detected by the first operation detection unit is processed as an operation for the first operation screen and a touch operation detected by the second operation detection unit is processed as an operation for the second operation screen.

4. The mobile electronic device according to claim 2, wherein the connection unit is further configured to transform the first housing and the second housing to a third form in which the first display surface of the first display unit and the second display surface of the second display unit face toward each other, and the control unit is configured to deactivate the display by the first display unit and the second display unit and deactivate a detection of touch operations by the first operation detection unit and the second operation detection unit when the first housing and the second housing are transformed to the third form.

5. The mobile electronic device according to claim 1, wherein the control unit is configured to suspend an execution of a first program for displaying the second operation screen on the second display unit in the first state, and to resume the execution of the first program when the first state is switched to the second state.

6. The mobile electronic device according to claim 1, further comprising an attitude detection unit configured to detect an attitude of the mobile electronic device, wherein the control unit is configured to switch the mobile electronic device to the first state when the attitude detection unit detects that the first display unit is directed to an upper direction, and to switch the mobile electronic device to the second state when the attitude detection unit detects that the second display unit is directed to the upper direction.

7. The mobile electronic device according to claim 1, wherein the control unit is configured to switch the mobile electronic device to the first state when the second operation detection unit detects a touch operation, and to switch the mobile electronic device to the second state when the first operation detection unit detects a touch operation.

8. The mobile electronic device according claim 1, further comprising an object detection unit configured to detect an object facing a surface of the first display unit, wherein the control unit is configured to switch the mobile electronic device to the first state when the object detection unit detects the object, and to switch the mobile electronic device to the second state when the object detection unit does not detect the object.

9. A control method executed by a mobile electronic device including a first display unit, a second display unit, a first operation detection unit and a second operation detection unit, the control method comprising:

detecting a touch operation on the first display unit by the first operation detection unit;

detecting a touch operation on the second display unit by the second operation detection unit;

switching the mobile electronic device between a first state and a second state;

in the first state, deactivating a display of a second operation screen on the second display unit, converting, when the touch operation on the second display unit is detected by the second operation detection unit, coordinates of a position of the touch operation on the second display unit into coordinates for a first operation screen displayed on the first display unit, and processing the touch operation detected by the second operation detection unit as an operation for the first operation screen displayed on the first display unit;

in the second state, deactivating a display of the first operation screen on the first display unit, converting, when the touch operation on the first display unit is detected by the first operation detection unit, coordinates of a position of the touch operation on the first display unit into coordinates for the second operation screen displayed on the second display unit, and processing the touch operation detected by the first operation detection unit as an operation for the second operation screen displayed on the second display unit;

setting a first detecting area in the first operation screen, for detecting a first operation; and setting a second detecting area in the second operation screen, for detecting a second operation corresponding to said first operation, wherein in the first state, the second detecting area is wider than the first detecting area, and in the second state, the first detecting area is wider than the second detecting area.

10. The control method according to claim 9, further comprising:

in the first state, deactivating the first operation detection unit; and in the second state, deactivating the second operation detection unit.

11. The control method according to claim 9, wherein the mobile electronic device further includes:

a first housing including the first display unit and the first operation detection unit;

a second housing including the second display unit and the second operation detection unit; and a connection unit configured to connect the first housing and the second housing, wherein the connection unit is configured to transform the first housing and the second housing between a first form in which a first display surface of the first display unit and a second display surface of the second display unit face toward substantially a same direction, and a second form in which the first display surface of the first display unit and the second display surface of the second display unit face away from each other in opposite directions, and the control method further comprises in response to a first touch detected by the first or second operation detection unit after the first housing and the second housing are transformed to the second form, switching the mobile electronic device to the first state when the second operation detection unit detects the first touch, and switching the mobile electronic device to the second state when the first operation detection unit detects the first touch.

12. The control method according to claim 9, further comprising:

detecting an attitude of the mobile electronic device; and switching between (i) execution and (ii) suspension of execution of three or more programs in accordance with the detected attitude of the mobile electronic device.

13. A non-transitory storage medium that stores a control program for causing, when executed by a mobile electronic device including a first display unit, a second display unit, a first operation detection unit and a second operation detection unit, the mobile electronic device to execute:

detecting a touch operation on the first display unit by the first operation detection unit;

detecting a touch operation on the second display unit by the second operation detection unit;

switching the mobile electronic device between a first state and a second state;

in the first state, deactivating a display of a second operation screen on the second display unit, converting, when the touch operation on the second display unit is detected by the second operation detection unit, coordinates of a position of the touch operation on the second display unit into coordinates for a first operation screen displayed on the first display unit, and processing the touch operation detected by the second operation detection unit as an operation for the first operation screen displayed on the first display unit;

in the second state, deactivating a display of the first operation screen on the first display unit, converting, when the touch operation on the first display unit is detected by the first operation detection unit, coordinates of a position of the touch operation on the first display unit into coordinates for the second operation screen displayed on the second display unit, and processing the touch operation detected by the first operation detection unit as an operation for the second operation screen displayed on the second display unit;

setting a first detecting area in the first operation screen, for detecting a first operation; and setting a second detecting area in the second operation screen, for detecting a second operation corresponding to said first operation, wherein in the first state, the second detecting area is wider than the first detecting area, and in the second state, the first detecting area is wider than the second detecting area.

14. A mobile electronic device, comprising:

a first display unit that includes a first display surface for displaying a first operation screen;

a first operation detection unit configured to detect an operation on the first display unit;

a second display unit that includes a second display surface for displaying a second operation screen;

a second operation detection unit configured to detect an operation on the second display unit; and a control unit configured to perform a switching control to switch between a first state and a second state, wherein the first and second display units have an arrangement in which the second display surface substantially overlaps the first display surface in a direction opposite to the first display surface, and in said arrangement, the control unit is configured in the first state, to deactivate a display of the second operation screen on the second display unit, to deactivate the first operation detection unit, and when the operation on the second display unit is detected by the second operation detection unit at a first position, to convert coordinates of the first position into coordinates on the first operation screen and process the operation detected on the second display unit as an operation for an item displayed on the first operation screen at a position behind and corresponding to the first position, and in the second state, to deactivate a display of the first operation screen on the first display unit, to deactivate the second operation detection unit, and when the operation on the first display unit is detected by the first operation detection unit at a second position, to convert coordinates of the second position into coordinates on the second operation screen and process the operation detected on the first display unit as an operation for an item displayed on the second operation screen at a position behind and corresponding to the second position.

* * * * *